(12) United States Patent
Monikandan

(10) Patent No.: US 8,291,313 B1
(45) Date of Patent: Oct. 16, 2012

(54) GENERATION OF A CONTAINER HIERARCHY FROM A DOCUMENT DESIGN

(75) Inventor: S. Monikandan, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 509 days.

(21) Appl. No.: 12/547,781

(22) Filed: Aug. 26, 2009

(51) Int. Cl.
*G06F 17/00* (2006.01)

(52) U.S. Cl. .................................................. 715/244

(58) Field of Classification Search .................. 715/234, 715/243, 244, 245, 246, 247, 273
See application file for complete search history.

(56) References Cited

U.S. PATENT DOCUMENTS

| | | | | |
|---|---|---|---|---|
| 5,208,906 A * | 5/1993 | Morgan | ................. | 715/212 |
| 5,893,127 A * | 4/1999 | Tyan et al. | ................. | 715/209 |
| 6,055,541 A * | 4/2000 | Solecki et al. | ................. | 1/1 |
| 6,161,114 A * | 12/2000 | King et al. | ................. | 715/202 |
| 6,175,830 B1 * | 1/2001 | Maynard | ................. | 1/1 |
| 6,177,936 B1 * | 1/2001 | Cragun | ................. | 715/760 |
| 6,377,285 B1 * | 4/2002 | Doan et al. | ................. | 715/764 |
| 6,519,557 B1 * | 2/2003 | Emens et al. | ................. | 704/8 |
| 6,636,242 B2 * | 10/2003 | Bowman-Amuah | ................. | 715/764 |
| 6,732,102 B1 * | 5/2004 | Khandekar | ................. | 1/1 |
| 7,636,882 B2 * | 12/2009 | Aureglia et al. | ................. | 715/227 |
| 7,818,691 B2 * | 10/2010 | Irvine | ................. | 715/856 |
| 7,934,151 B1 * | 4/2011 | Castrucci et al. | ................. | 715/222 |
| 2003/0018646 A1 * | 1/2003 | Ohta et al. | ................. | 707/100 |
| 2004/0199428 A1 * | 10/2004 | Silverbrook et al. | ................. | 705/16 |
| 2007/0083533 A1 * | 4/2007 | Mirkazemi et al. | ................. | 707/100 |
| 2007/0094609 A1 * | 4/2007 | Gilboa et al. | ................. | 715/762 |
| 2008/0040661 A1 * | 2/2008 | Curtis et al. | ................. | 715/243 |
| 2008/0320254 A1 * | 12/2008 | Wingard et al. | ................. | 711/157 |

OTHER PUBLICATIONS

Wylie, "Exporting CSS and images in Fireworks CS4", http://www.adobe.com/devnet/fireworks/articles/export_css_images_print.html, obtained Aug. 24, 2009, 10 pages.

* cited by examiner

*Primary Examiner* — Laurie Ries

(74) *Attorney, Agent, or Firm* — Robert C. Kowert; Meyertons, Hood, Kivlin, Kowert & Goetzel, P.C.

(57) ABSTRACT

In an example embodiment, a container hierarchy may be determined for a document design, such as, for example, a web page design, through an iterative technique for partitioning a plurality of containers into one or more rows and one or more columns.

20 Claims, 13 Drawing Sheets

200

Row 101

C01
 C02
 C03

Row 102

C04
 C05

Row 103

C06
 C07
 C08
 C09
 C10
 C11
 C12
 C13
 C14

Continued at

GENERATION OF A CONTAINER
HIERARCHY FROM A DOCUMENT DESIGN

FIELD

Subject matter disclosed herein may relate to generating markup language code including a container hierarchy from a document design, such as, for example, a web page design.

BACKGROUND

Web page designers may face challenges in generating production markup language code from their designs. Web page designers may seek help from individuals such as Web page developers with expertise in writing markup language code to generate markup language code for their designs. Web page designers may design a web page using vector tools to draw rectangles, lines, etc., and may further utilize bitmap tools to apply "skins" to objects in the Web page design. A Web page developer may observe the design and may write a markup language "skeleton" for the design. For one example using Hypertext Markup Language (HTML), the skeleton may comprise a number of "<div>" tags. The <div> tag may be utilized in HTML documents to define a division or section of a document.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings.

Figure 1:
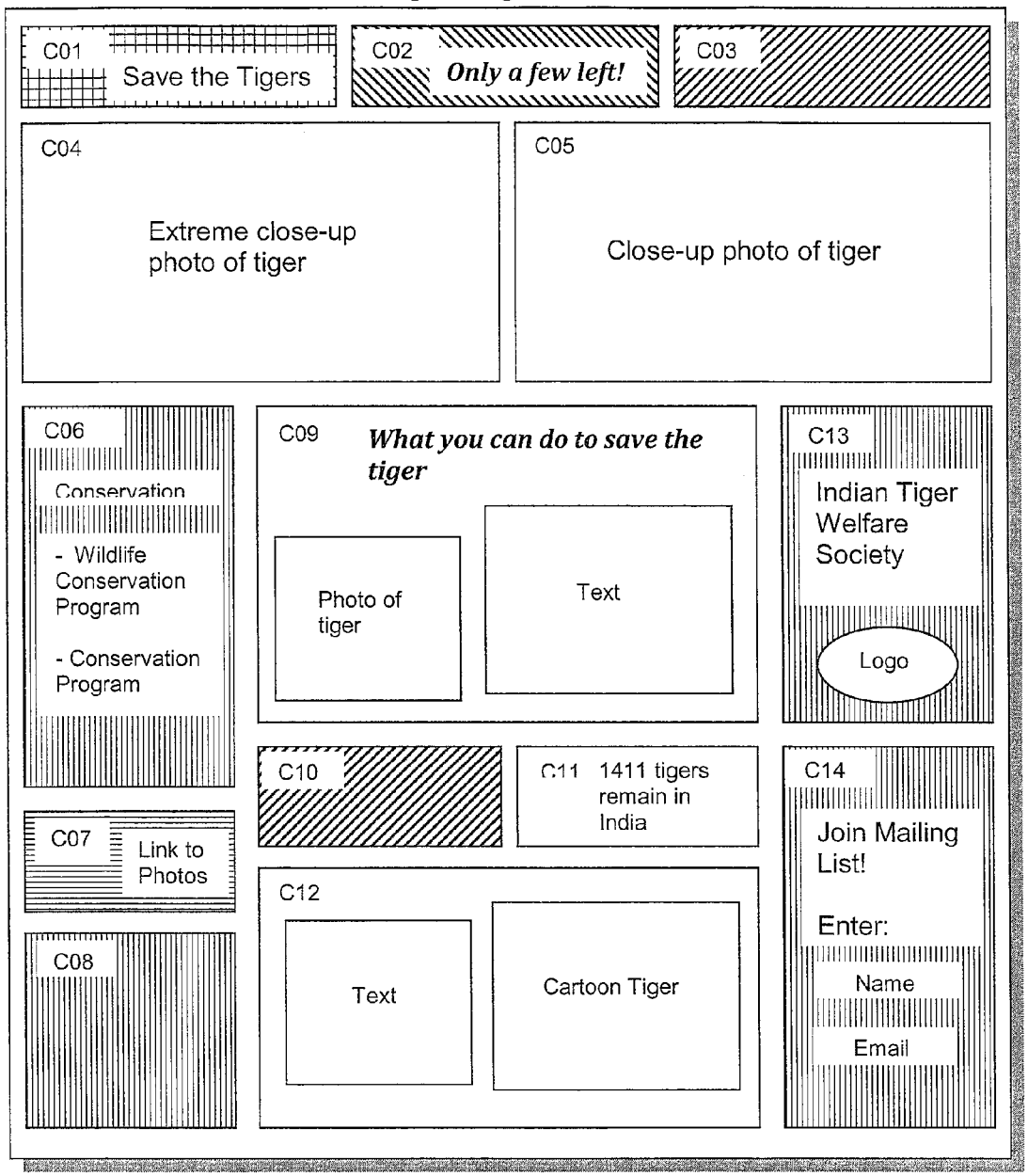
FIG. 1 is an illustration of an example Web page design.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

As discussed above, Web page designers may face challenges in generating production markup language code from their designs. Web page designers may seek help from individuals such as Web page developers with expertise in writing markup language code to generate markup language code for their designs. Of course, utilizing a Web page developer to write markup language code may increase costs and may also decrease efficiency, given the amount of time the developer may require to generate the markup language code from the Web page design. Embodiments described herein provide an automated technique for generating markup language code based at least in part on a document design, such as a Web page design, for example, such that the Web page designer may generate the markup language code him/herself, in some example implementations.

To generate markup language code for a Web page design, a Web page developer may observe the Web page design and may write a markup language "skeleton" for the design. For one example using Hypertext Markup Language (HTML), the skeleton may comprise a number of "<div>" tags. The <div> tag may be utilized in HTML documents to define a division or section of a document. The <div> tag may further be used to group block-elements in order to format them with styles. Rectangles or other design elements that resemble rectangles may be converted to <div> statements by the Web page developer. The rectangles may include other design elements such as images and text, for example. To add the images and text, for this example, the developer may add <img> and <p> elements to the HTML code. The developer may further generate HTML code to apply colors and/or background images to the Web page, for example, based on the Web page design. For one or more embodiments, a Web design tool may be implemented to automatically generate at least a portion of such markup language code.

In an example embodiment, a software application Web page design tool executed on a computing platform may be utilized by a Web page designer to design a Web page. The design tool may allow the user to draw a box using a pointing device such as a mouse. The box drawn by the user may be referred to as a "container" that may represent a "<div> object", in that the box/container may be converted into one or more <div> statements as the Web page design is converted into markup language code. A Web page designer may draw any number of containers.

One technique that may be utilized in positioning the blocks may be referred to as "relative" positioning of the blocks. With relative positioning, the blocks may be automatically rearranged if other content is added or taken away from the Web page. In the present example embodiment, the hierarchy of <div> statements and the relative position of the <div> objects may be determined automatically, and markup language code may be generated accordingly, without the need of another individual to generate the markup language code. As used herein, the term "container" refers to any device utilized by a user of a design tool to designate a section or division of a document that may be converted to a <div> object or other similar markup language code statement or other designator that denotes a section, cell, or division of a document.

FIG. 1 is an illustration of an example Web page design 100. For this example, a number of containers have been drawn. As previously noted, in one or more embodiments, a software application Web design tool permitting the utilization of a rectangle drawing tool may be utilized whereby a user may define a number of sections of page 100. For such an embodiment, the rectangle tool may have the ability to tag drawn rectangles with <div> tags, generating what may be referred to as containers, as previously discussed. The containers for this example are labeled C01-C14. Of course, this is merely an example design, and any number of variations are possible. As noted previously, containers may contain images, text, hyperlinks, etc.

For the example Web page design 100 depicted in FIG. 1, in general, an example embodiment of a <div> hierarchy determination process may iterate through all of the <div> objects, or containers, in designed Web page 100 to determine how the <div> objects may be organized into rows and/or columns and also to determine an order of the <div> objects. At least in part in response to making such determinations, HTML and/or cascading style sheet (CSS) code defining a container hierarchy may be automatically generated and exported, as well as code specifying relative positions for the multiple containers C01-C14. In this manner, the process for generating markup language code from a Web page design such as design 100 may be simplified and/or automated. In one or more embodiments, such capability may be implemented in a software application Web design tool to enable Web designers to generate such HTML and/or CSS code, and/or other markup language code. As used herein, the term "export" refers to generating markup language code from a Web page design and storing that markup language code in a file in a memory. The memory may comprise, for example, a disc drive, although the scope of claimed subject matter is not limited in this respect.

In the present example embodiment, a distance between two <div> objects may be expressed as the left or right margins of those <div> objects. Similarly, for the present embodiment, a vertical distance between two rows may be generated and exported as the top or bottom margins of the <div> objects making up the rows. In one embodiment, the relative horizontal positions among a plurality of containers may be specified by the left and right margin values for the individual containers, and the relative vertical positions among the plurality of containers may be specified by the top and/or bottom margin values for the individual containers. In this manner, relative positioning of the various <div> objects of the Web design may be maintained during generation and exportation of the markup-language code. Of course, the scope of claimed subject matter is not limited to any particular positioning technique.

One example embodiment of a technique for automatically determining a hierarchy of <div> statements and for providing relative positioning of <div> objects is discussed below and illustrated in FIGS. 2a-2g, 3a-3b, and 4. Of course, the process described below is merely an example process, and other processes may be utilized in other embodiments.

Figure 2A:
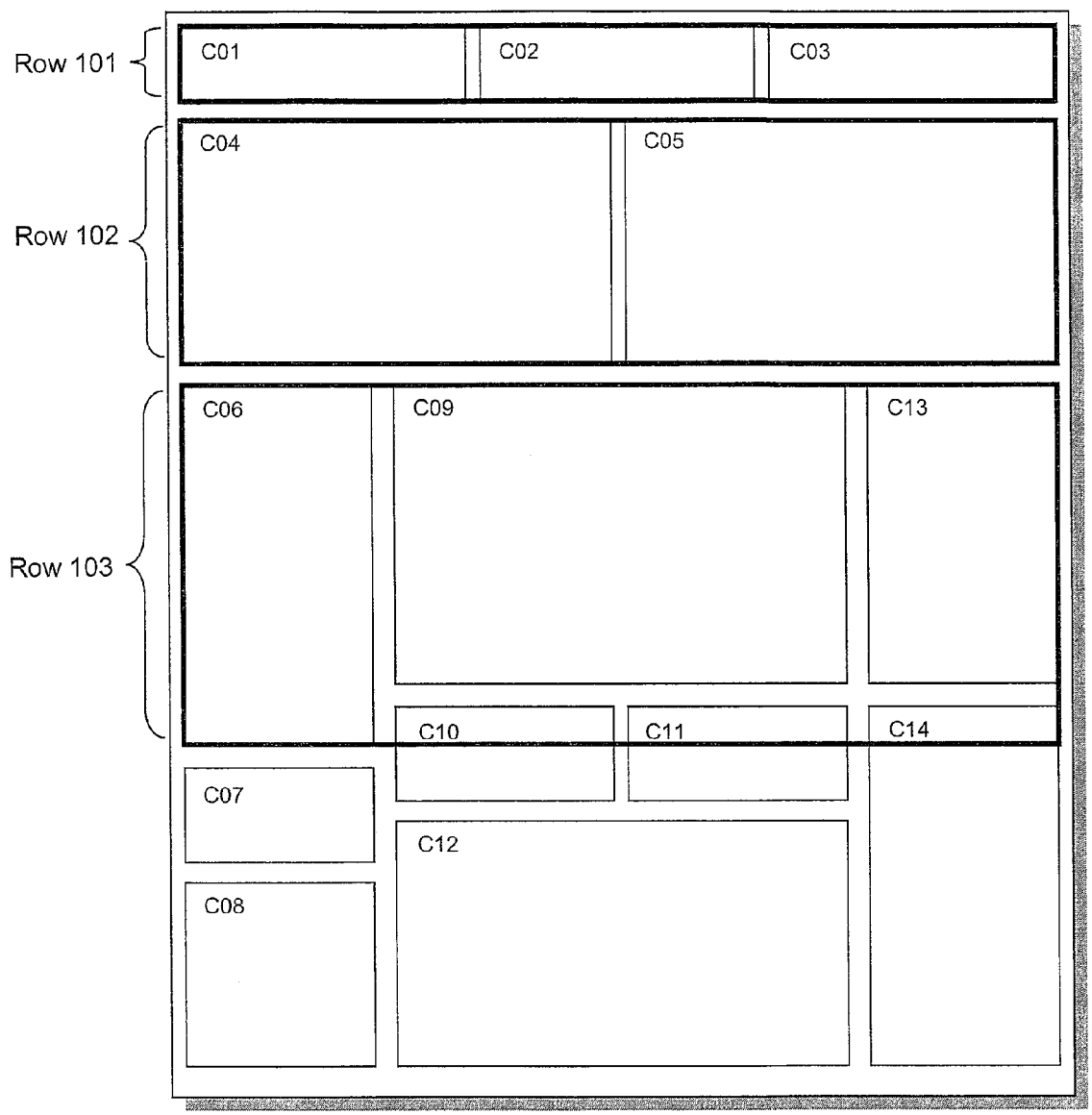
FIG. 2a is an illustration of an example iterative process for partitioning containers of a Web page design into rows and columns to generate a container hierarchy.

FIG. 2a is an illustration of a beginning stage of an example iterative process for partitioning containers C01-C14 of Web page design 100 into rows and columns to generate a container hierarchy. In an embodiment, the process may begin by selecting a container, which for this example is container C01. As depicted in FIG. 2a, a row 101 may be initially formed with a height determined by the height of container C01 and with a width that comprises the width of the document. Other containers may be analyzed to determine whether any part of the respective containers intersect row 101. If so, row 101 is made tall enough to accommodate such containers. For the example depicted in FIG. 2a, containers C02 and C03 individually intersect row 101. Because containers C02 and C03 have the same height as container C01 for this example, the height of row 101 is maintained as that of the height of container C01. At this junction, row 101 may be said to include containers C01-C03.

At least in part in response to the completion of the formation of row 101, another container that has not yet been assigned to a row may be selected and a new row may be formed. For the present example, container C04 is selected and row 102 is formed, as depicted in FIG. 2. Row 102 is formed with a height of that of container C04, and the width of row 102 is the width of the document. Other containers are analyzed to determine whether any portion of the individual containers intersect row 102. As can be seen in FIG. 2a, container C05 is contained completely within row 102. Row 102 at this junction may be said to include containers C04 and C05.

Container 06 for this example is selected as a base for the formation of row 103. As was the case for rows 101 and 102, the height of row 103 is specified as the height of the base container, which for this example is container C06. The width of row 103 is the width of Web page design 100. Other containers that have not yet been assigned to a row may be analyzed to determine whether any portion of those containers intersects row 103. As may be seen in FIG. 2a, containers C10 and C11 have portions that intersect row 103.

Figure 2B:
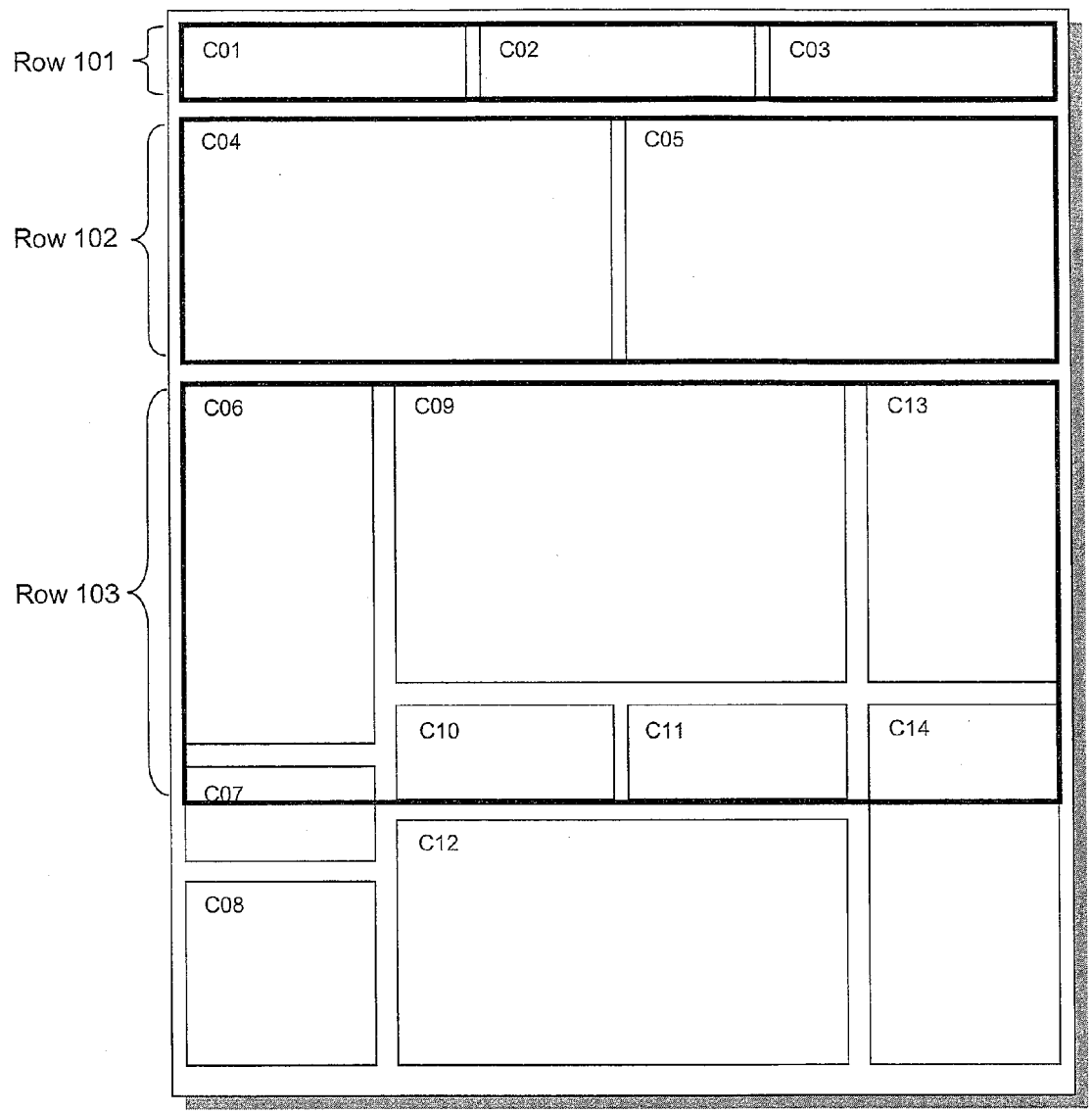
FIG. 2b is a continued illustration of an example iterative process for partitioning containers of a Web page design into rows and columns to generate a container hierarchy.

FIG. 2b is a further illustration of the example discussed above in connection with FIG. 2a. As can be seen in FIG. 2b, row 103 has had its height adjusted to accommodate containers C10 and C11. At least in part in response to the change in the height of row 103, containers that have not yet been assigned to a row may be individually analyzed to determine whether any portion of the containers intersect the new dimensions of row 103. Observing FIG. 2b, it is clear that for this example, containers C07 and C14 partially intersect row 103.

Figure 2C:
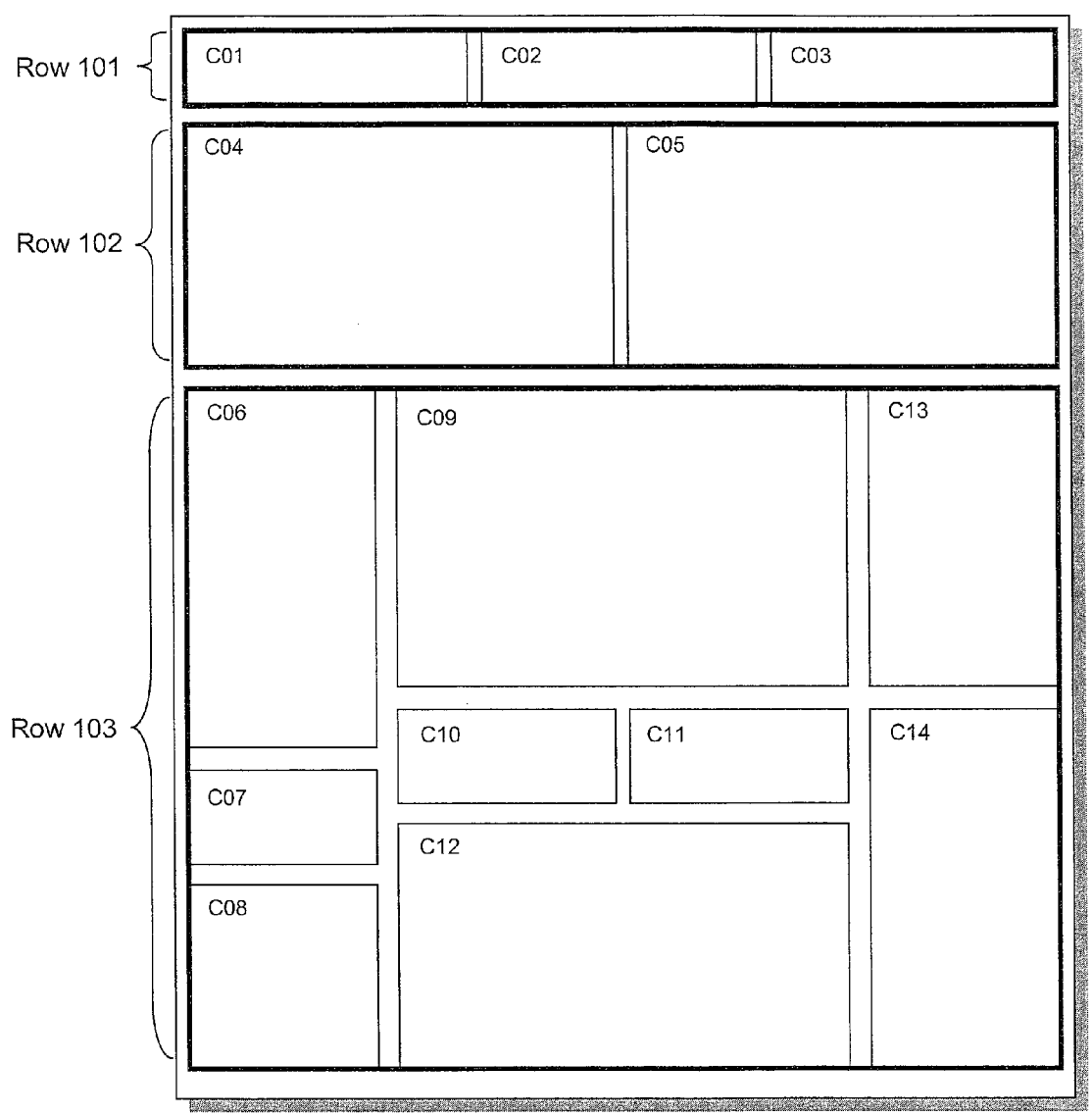
FIG. 2c is a further illustration of an example iterative process for partitioning containers of a Web page design into rows and columns to generate a container hierarchy.

FIG. 2c illustrates that in order to accommodate container C14 in row 103, the height of row 103 is adjusted for this example to cover the remainder of Web page design 100, thereby accommodating all remaining containers heretofore unassigned to a row. Row 103 at this point may be said to include containers C06-C14, and all containers of Web page design 100 have been assigned to one of the three rows, for this example.

Figure 2D:
FIG. 2d is an illustration of an example intermediate container hierarchy.
Figure 2D:
Figure 2D:
Figure 2D:
Figure 2D:
Figure 2D:
Figure 2D:
Figure 2D:
Figure 2D:
Figure 2D:
Figure 2D:
Figure 2D:
Figure 2D:
Figure 2D:
Figure 2D:
Figure 2D:
Figure 2D:

FIG. 2d is an illustration of an example intermediate container hierarchy 200 generated in accordance with the container design illustrated in FIG. 1. The container hierarchy may include information regarding parent-child relationships among the containers of the Web page design, and may further provide information related to where on the Web page the various containers are to be displayed. For this and other embodiments, the hierarchy of the various "<div>" statements may determine how the various block-elements of the coded Web page will be placed when viewed in a browser application. The organization depicted in FIG. 2d may be considered to be intermediate because the example embodiment under discussion has not yet completed. However, as can be seen in FIG. 2d, all of containers C01-C14 have been assigned to a row. Row 101 includes containers C01-C03, row 102 includes containers C04-C05, and row 103 includes containers C06-C14.

Figure 2E:
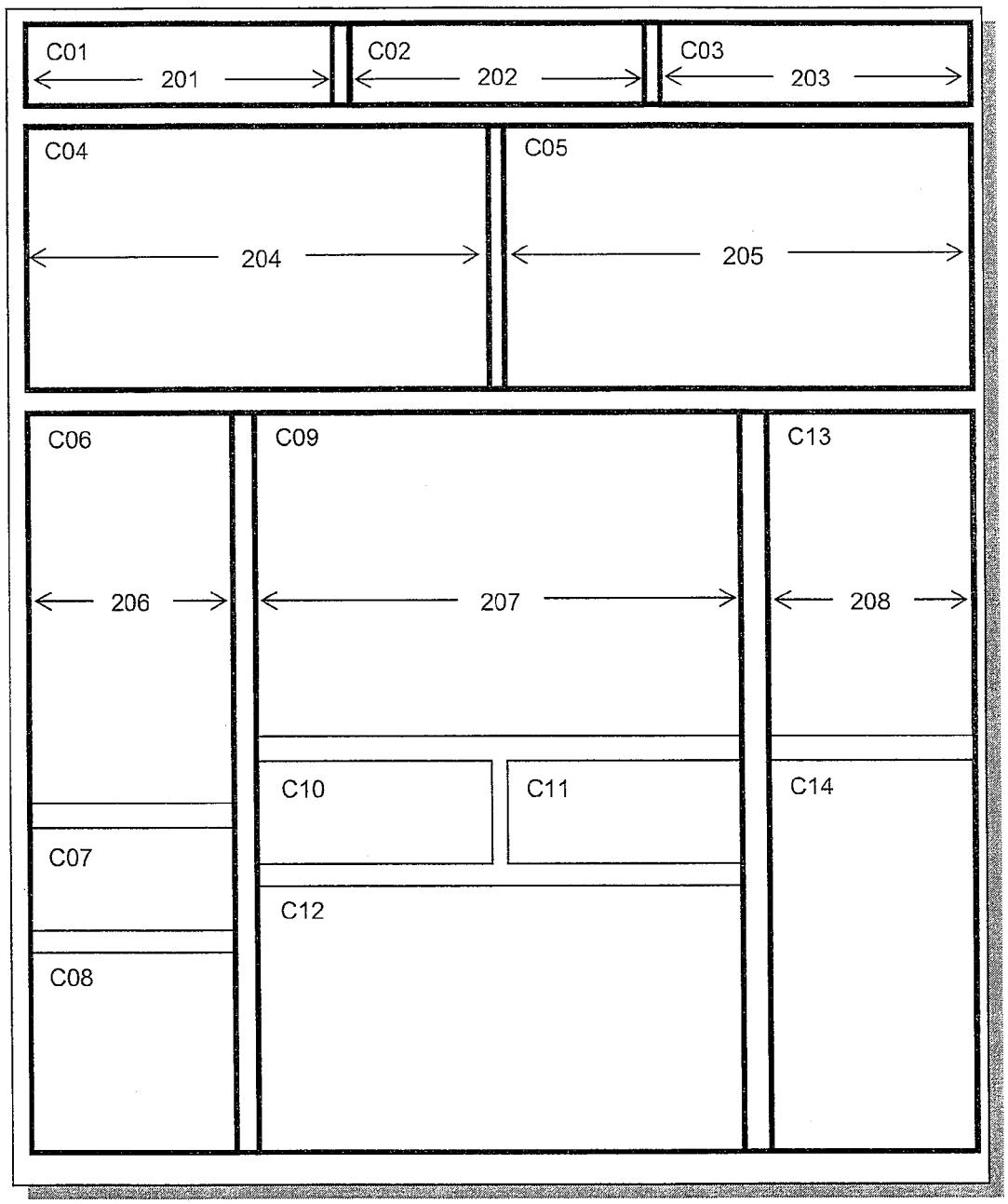
FIG. 2e is a continued illustration of an example iterative process for partitioning containers of the Web page design into rows and columns to generate the container hierarchy.

FIG. 2e is a continued illustration of the example iterative process started above for partitioning containers C01-C14 of Web page design 100 into rows and columns to generate a container hierarchy. In FIGS. 2a-2d, the containers of design 100 were sorted into rows. At least in part in response to the division of containers C01-C14 into rows, the various rows of design 100 may be partitioned into one or more columns. Observing first row 101, container C01 is selected and a column 201 is created with a width equal to the width of container C01. Next, for this example embodiment, the next container of row 101 is analyzed and another column 202 is created with a width of that of container C02 and a height equal to the height of row 101. Similarly, a column 203 is created to include container C03.

Continuing the present example with row 102, a column 204 is generated to include container C04. Again, as with the other columns formed in row 101, the column is formed with a width determined by the width of the container, and the height of the row determines the height of the column. Analyzing the remaining container in row 102, it may be determined that a column 205 be formed to include container C05 with the width of C05 and the height of row 102. In response to there being no further containers in row 102 to process, the containers of row 103 may be analyzed and additional columns may be formed.

To partition the containers of row 103 into columns, container C06 may serve as a basis for a new column 206. As with the other columns formed in rows 101 and 102, the new column assumes the width of the container, and also assumes the height of the row. Thus, for this example of row 103 and container C06, column 206 takes the width of C06 and takes the height of row 103. At least in part in response to the formation of the column, other containers not yet assigned to a column may be analyzed to determine whether any portion of the containers intersect with column 206. In this example, column 206 includes additional containers C07 and C08. Because these containers are completely within the current borders of column 206, it is not necessary to adjust the width of column 206 to accommodate either of the additional containers. However, in other situations the width of a column may be adjusted so that a partially intersecting container fits completely within the column.

At least in part in response to forming column 206 with containers C06-C08, container C09 is analyzed, and a new column 207 is formed with the width of that of the container and with a height equal to the height of row 103. As may be seen in FIG. 2e, column 207 includes containers C09-C12, and no adjustment to the width of the column is required to accommodate any of the containers. A column 208 is formed at least in part in response to containers C09-C12 being assigned to column 207, with container C13 forming the basis for column 208. Because column 208 extends the height of row 103, container C14 is also assigned to column 208. At this point in the example process, design 100 has been partitioned into rows, and in response to the division into rows, design 100 was further partitioned in columns. The general process of partitioning the containers of a design by rows and by columns may be repeated in an iterative fashion until all of the containers are assigned to a unique row or column. That is, all of the columns or rows generated by the division process include a single container and conversely, every container is assigned to a single row or column. For the example of FIG. 2e, column 206 includes more than one container, as does columns 207 and 208. Thus, another iteration may be performed, as depicted in FIGS. 2f and 2g.

Figure 2F:
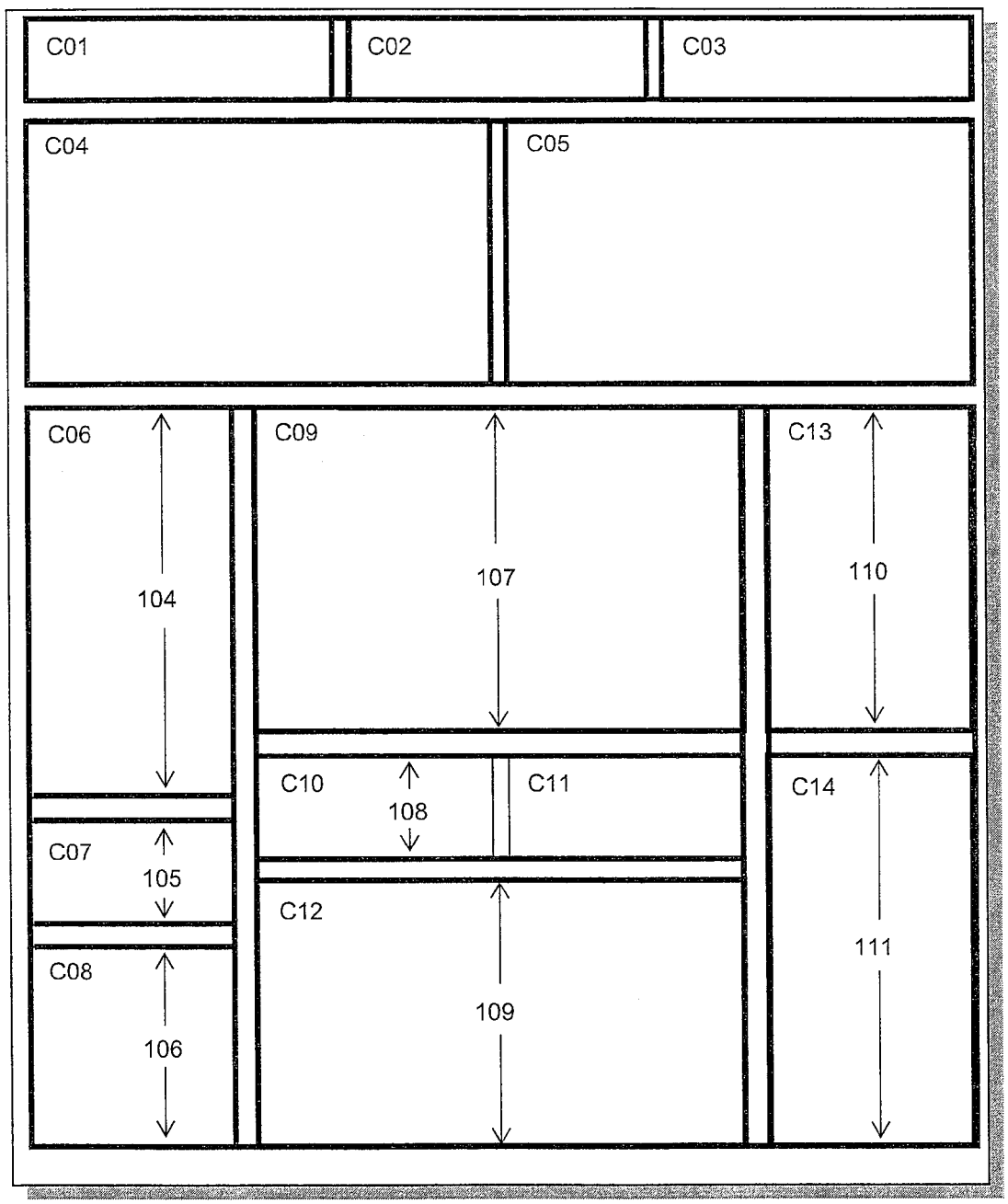
FIG. 2f is a further illustration of an example iterative process for partitioning containers of a Web page design into rows and columns to generate a container hierarchy.

FIG. 2f is a further illustration of the example iterative process for partitioning containers C01-C14 of Web page design 100 into rows and columns to generate the container hierarchy. As mentioned above, because some columns and some rows have more than one container, another iteration of the various operations described above for partitioning containers of a design into rows and columns may be performed. For the present example, column 206 includes containers C06, C07, and C08. Starting with container C06, a new row 104 may be created based on container C06, giving row 104 a height equal to the height of the of container C06. The width of row 104 comprises the width of column 206. Moving on to container C07, a new row 105 is created, giving row 105 the height of container C07 and the width of column 206. Likewise, with respect to container C08, a new row 106 is generated with the height of container C08 and the width of column 206. Column 206 at this point includes rows 104, 105, and 106, where each row includes one container.

At least in part in response to partitioning column 206 into rows, column 207 may also be partitioned into several rows. As depicted in FIG. 2f, using the techniques described previously, rows 107, 108, and 109 are created, with row 108 including multiple containers. Further, column 208 is partitioned into rows 110 and 111. In observing FIG. 2f, it may be seen that the only row or column to include more than one container in row 108, which includes containers C10 and C11.

Figure 2G:
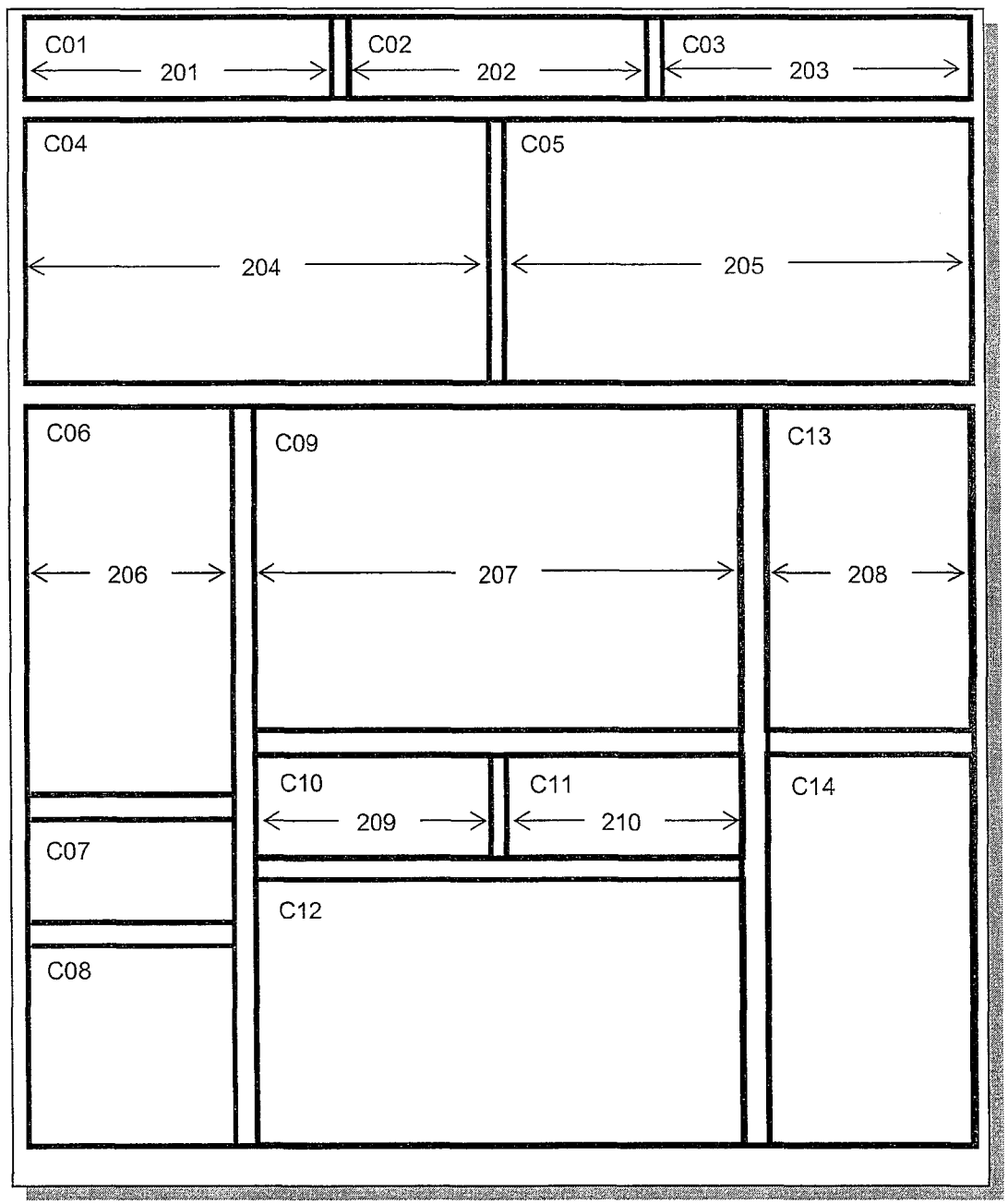
FIG. 2g is a continued illustration of an example iterative process for partitioning containers of a Web page design into rows and columns to generate a container hierarchy.

FIG. 2g shows that row 108 may be partitioned into columns 209 and 210 to accommodate containers C10 and C11, respectively. At this point, all of the rows and/or columns of Web page design 100 include a single container, and no further divisions into rows or columns are possible.

Figures 3A, 3B:
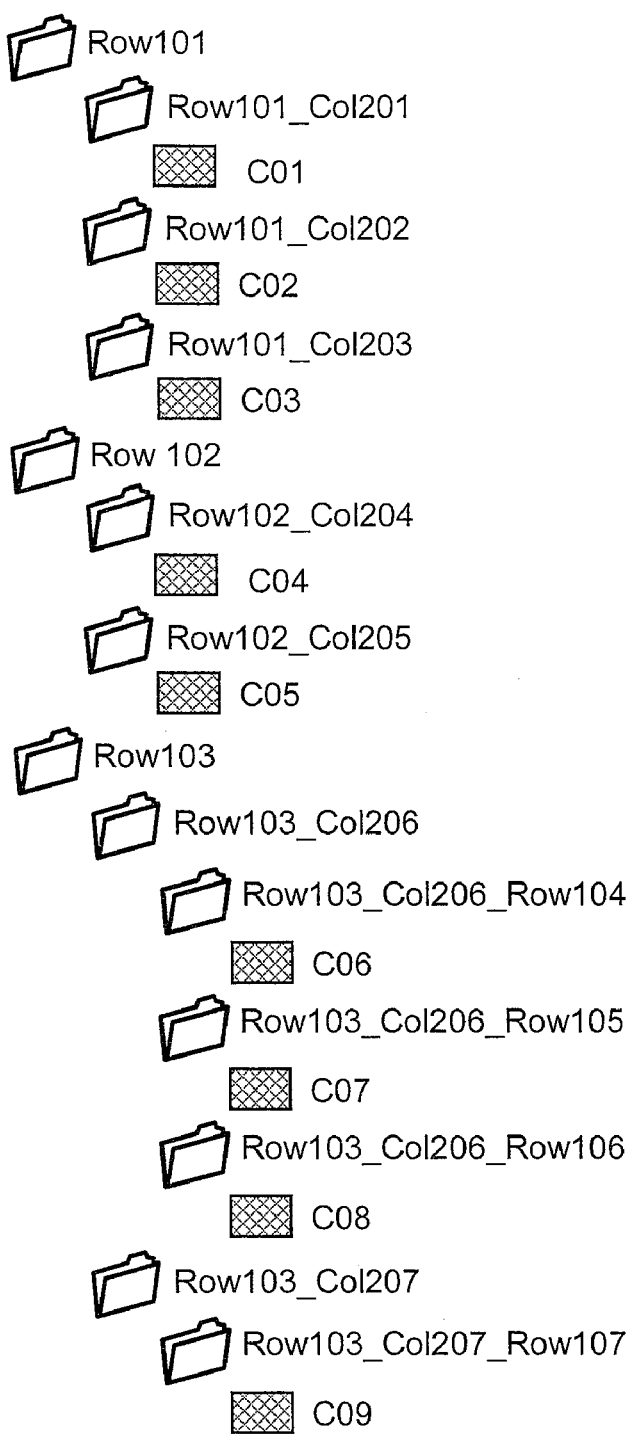
FIG. 3a depicts an example container hierarchy generated from an example Web page design.
FIG. 3b further illustrates an example container hierarchy generated from an example Web page design.
Figure 3B:
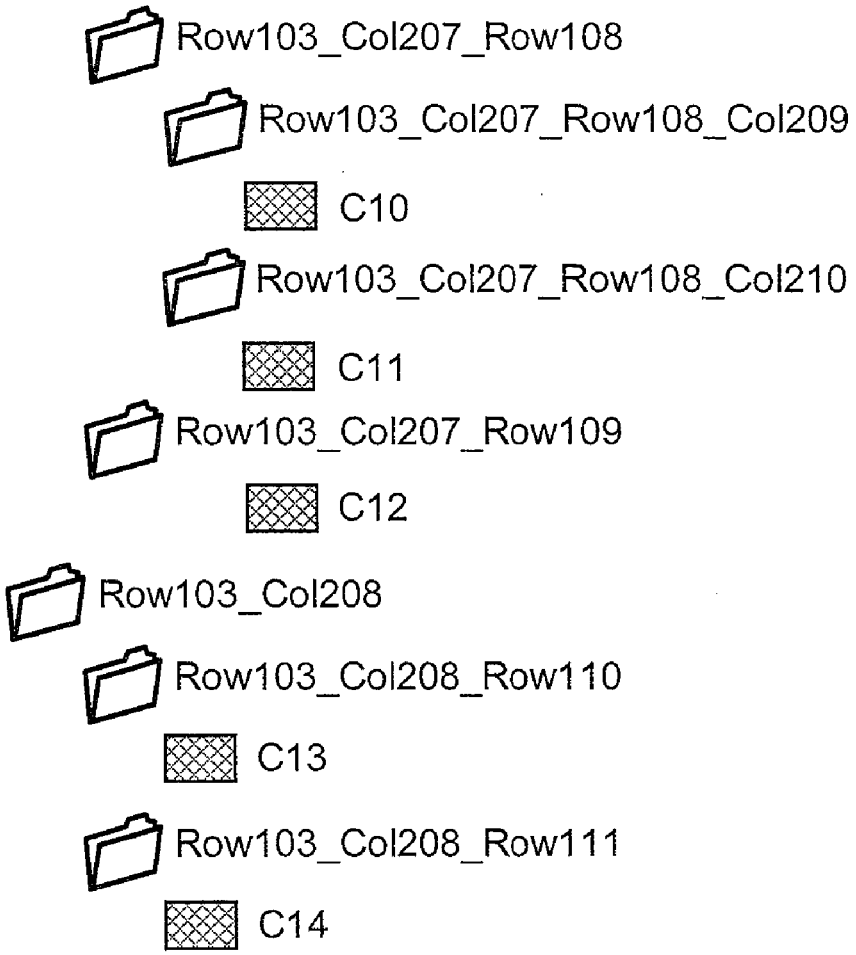

FIGS. 3a and 3b depict an example container hierarchy 200 generated from example Web page design 100 using the techniques described above in connection with the example embodiment depicted in FIGS. 1 and 2a-2g. For the present example depicted in FIG. 3a, it can be seen that no row or column includes more than one container, and that no further divisions of the containers in possible. Also, for the example embodiment, the hierarchy is labeled according to the names of the rows and columns utilized in FIGS. 2a-2g. While no further divisions are possible for this hierarchy, it is possible, in one or more embodiments, to simplify the hierarchy without losing any information related to relative positioning and/or parent-child relationships.

Figure 4:
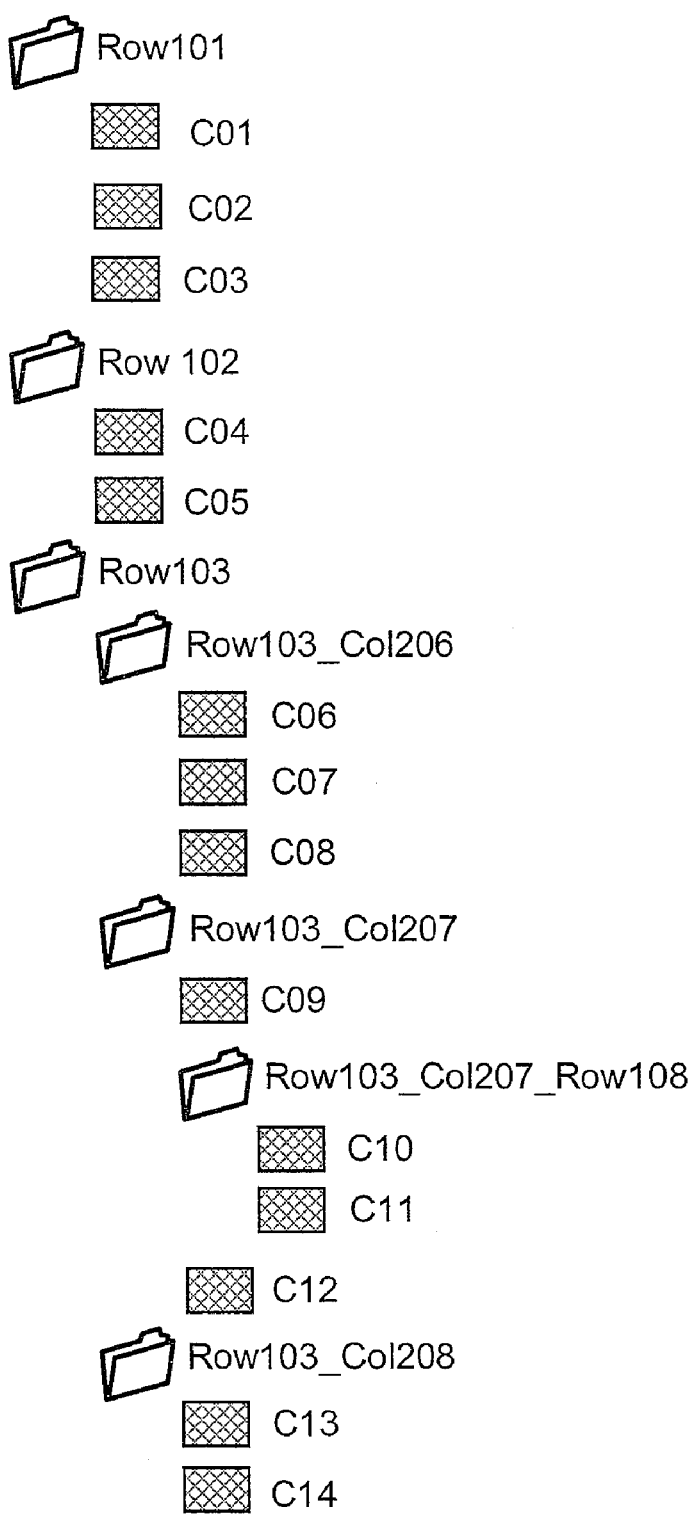
FIG. 4 is depicts a simplified container hierarchy generated from an example Web page design.

FIG. 4 is depicts a simplified container hierarchy 200 generated from example Web page design 100. For this example embodiment, rows and/or columns with no more than one element may be removed from the hierarchy and any element from such a row or column may be moved to the row or column's parent in order to simplify the hierarchy. For example, it is possible to remove the elements Row101_Col201, Row101_Col202, and Row101_Col203 from the hierarchy and assign C01, C02, and C03 directly to element Row101, as depicted in FIG. 4. Other simplifications may be performed utilizing this example technique, as may be seen in comparing the hierarchies in FIGS. 3*a*-3*b* and FIG. 4.

An additional example embodiment of a technique for automatically determining a hierarchy of <div> statements and for providing relative positioning of <div> objects for a Web page design such as design 100 is provided below. As noted previously, "<div> statements", "<div> objects", and "containers" are synonymous terms, and such terms may be used herein interchangeably. Such a technique may be performed by a computing platform comprising a processor, for example. Of course, the technique described below is merely an example technique, and other techniques may be utilized in other embodiments. For the present example embodiment, the following example operations may be performed:

1. Generate a list of all the <div> objects in the document. For an example embodiment, the <div> objects may be represented by containers drawn as rectangles by a user utilizing a software application executed on a computing platform.
2. Select an object from the list and label it as "object A".
3. Create an empty row.
4. Set the width of the row to equal it's parent's width. Set the height of the row to equal the height of object A.
5. Add object A to the newly created row.
6. Select the next <div> object from the list from operation 1 and label the next object as "object B". If there is no object remaining, go to operation 12.
7. Determine whether the bounds of object B overlap with any of the existing rows.
8. If object B overlaps with one row, add object B to that row and adjust the row height to accommodate object B.
9. If object B does not overlap with any of the existing rows, re-label object B as object A and go to operation 3.
10. If object B overlaps with more than one row, merge the rows, resize the height of the new row to fit object B, and add object B to the new row.
11. Go to operation 6
12. Generate a list of rows created so far.
13. Set the first row as the current row.
14. Create an empty column with a height equal to it's parent's height.
15. Add the new column to the column list of the current row.
16. Select a first object, label the first object as "object A".
17. Add object A to the newly created column and adjust the column width to fit object A.
18. Get the next object and label it "object B". If there are no remaining objects, go to operation 24.
19. Determine whether object B overlaps with any of the existing columns in the current row.
20. If object B overlaps, add object B to that column.
21. If object B overlaps with more than one column, merge those columns and add object B to that column.
22. Resize the column width to accommodate the merged objects and object B.
23. Go to operation 18.
24. Generate a list of columns created so far in the current row.
25. Set the first column as the current column and get the list of objects in it.
26. If the list has more than one object go to operation 2.
27. If additional columns remain from the list created in operation 24, set the next column as the current column, retrieve the list of objects in the current column and go to operation 25.
28. If additional rows remain from the list created in operation 11, set the next row as the current row and go to operation 14.
29. This operation should be reached if all the rows and columns have only one <div> object in it, indicating a proper layout and a successful determination of the hierarchy of <div> objects and the ability to provide relative positioning for the <div> objects. If any of the rows or columns have more than one <div> object, a proper layout is not indicated, and relative positioning of the <div> objects may not be provided upon generation of the markup-language code. However, the various user-drawn containers of the design may rather be exported in markup-language code as absolutely positioned <div> objects.
30. Rows or columns with no more than one element may be removed from the hierarchy and any element from such a row or column may be moved to the row or column's parent in order to simplify the hierarchy.

The example technique described above utilizes many of the same features and operations of the example process illustrated in FIGS. 2*a*-2*g*, 3*a*-3*b*, and 4. Of course, while some elements between the various embodiments described herein are similar, the various embodiments may differ from each other any of a number of ways, and the scope of claimed subject matter is not limited to any particular embodiment. Also, it should be noted that while the embodiments described herein discuss partitioning containers of a design into rows and then into columns, the scope of claimed subject matter is not so limited, and other embodiments in accordance with claimed subject matter may partition into columns and then into rows. Further, depending on one's point of reference, the terms "row" and "column" may be interchangeable. Thus claimed subject matter referring to partitioning containers into rows and partitioning rows into columns also refers to partitioning containers into columns and partitioning columns into rows.

Figure 5:
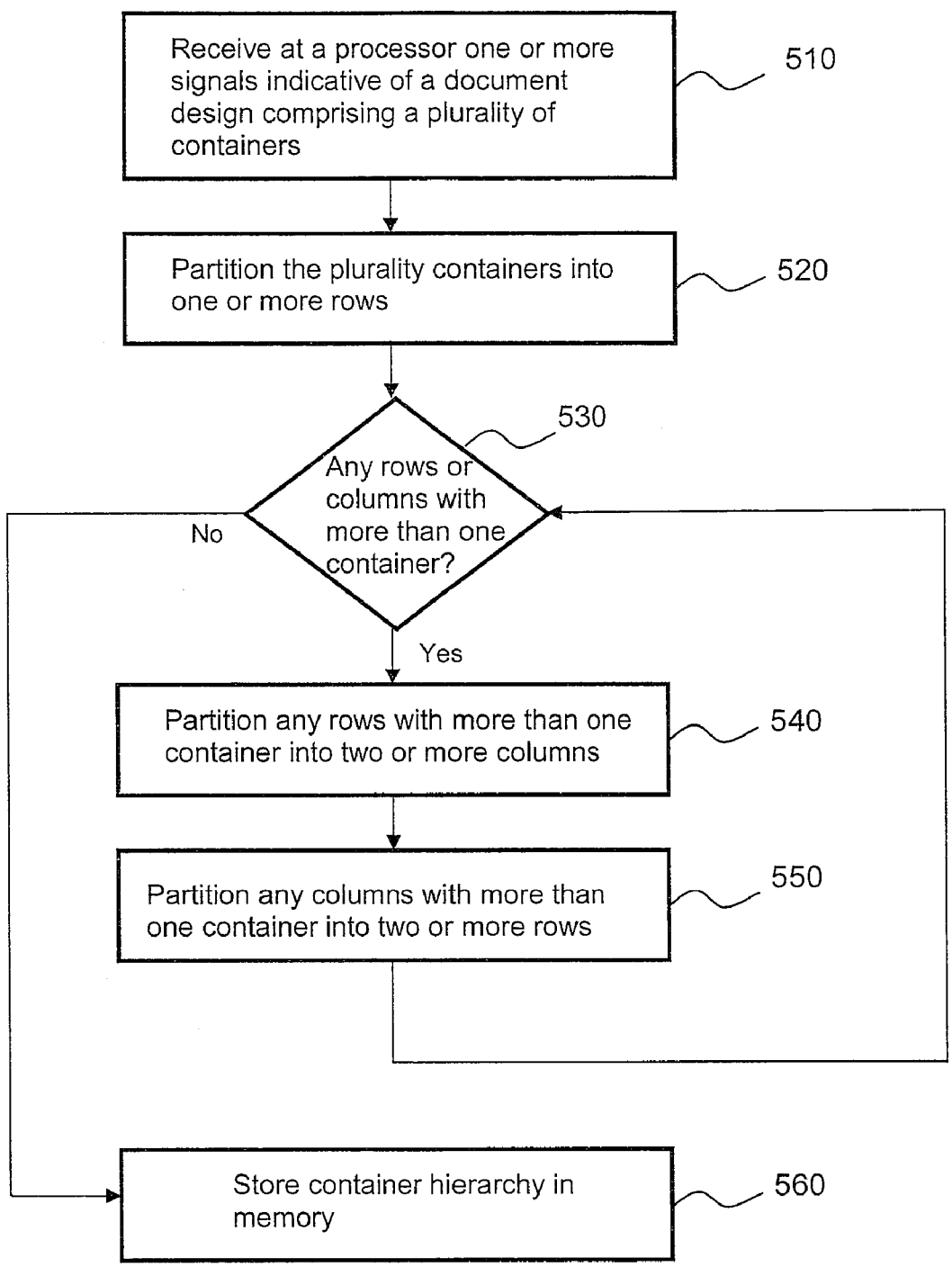
FIG. 5 is a flow diagram depicting an example technique for generating a container hierarchy for a web page design.

FIG. 5 is a flow diagram depicting an example technique for generating a container hierarchy for a document design. For one example embodiment, the document design may comprise a web page design, although the scope of claimed subject matter is not limited in this respect. At block 510, one or more signals indicative of a document design comprising a plurality of containers may be received at a processor. The plurality of containers may be partitioned into one or more rows at block 520. At block 530, a determination may be made as to whether, following the division of the containers into one or more rows, any rows or columns exist with more than one container assigned. If no rows or columns exist with more than one container, the process moves to block 570, where the generate container hierarchy may be stored in a memory.

If at block 530 it is determined that there are one or more rows or columns with more than one container assigned, at block 540 any rows with more than one container assigned to it may be partitioned into two or more columns. At block 550, any columns with more than one container may be partitioned into two or more rows, and processing returns to block 530. For the present example embodiment, blocks 530-550 may be repeated as many times as necessary to produce a container hierarchy where no row or column includes more than one container. If at block 530 it is determined that no column or row has more than one container, the hierarchy is complete and may be stored in a memory at block 560. Of course, embodiments in accordance with claimed subject matter may include all of, less than, or more than blocks 510-560. Also, the order of blocks 510-560 is merely an example order, and the scope of claimed subject matter is not limited in this respect.

As used herein, the term "document" is meant to include any of a wide range of document types, including, for example, Web pages, word processing documents, visual design pages, images, etc. In one example embodiment, the document may comprise a visual design document, such as a document that may be produced by an application such as Photoshop, for example. For such a document, in an example embodiment, a user may place at any random locations on the document one or more text boxes, for example. The techniques described herein in connection with FIGS. 1 through 5 may be utilized to create a table, and the text boxes may be exported as contents inside of one or more cells of the table, for an example embodiment. It should be noted that claimed subject matter is not limited to the specific Web page design based examples depicted in FIGS. 1 through 5, and other document types may be analyzed and output may be generated utilizing one or more aspects of the techniques described herein.

Figure 6:
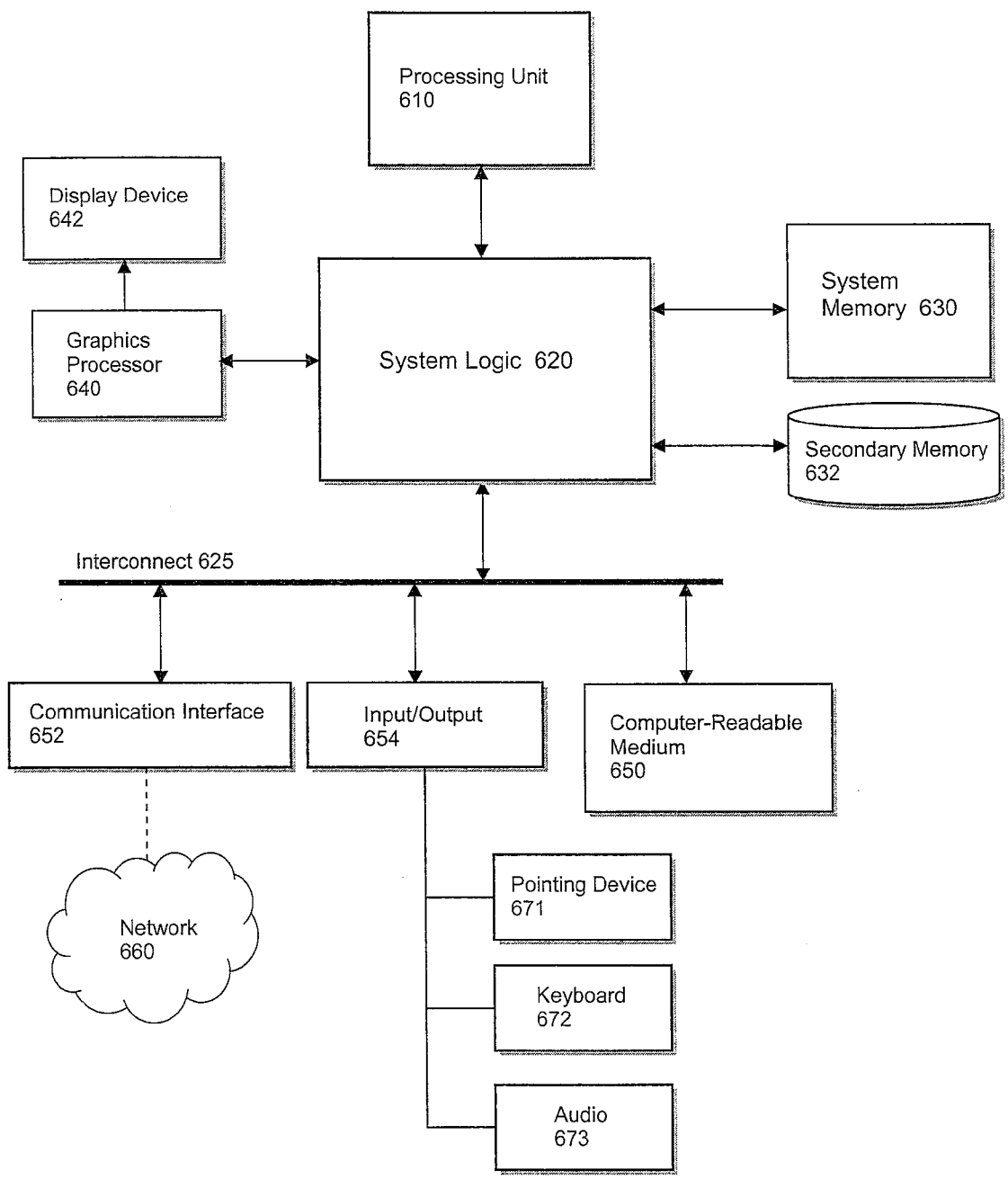
FIG. 6. is a schematic diagram of an example embodiment of a computing platform.

FIG. 6 is a schematic diagram illustrating an exemplary embodiment of a computing platform 600 that may include one or more devices adapted to implement techniques and/or processes described above in connection with generating container hierarchies for document designs discussed above in connection with FIGS. 1, 2a-2g, 3a-3b, and 4-5, for example. Computing platform 600 may comprise, for example, one or more of a desktop computer, a laptop computer, a workstation, a server device, or a personal computing or communication device or appliance. Such personal computing or communication devices or appliances may comprise, for example, a personal digital assistant, a mobile communication device, or the like. Computing platform 600 may also comprise, for example, computing system and/or associated service provider capability, such as, for example, a database or data storage service provider/system, a network service provider/system, an Internet or intranet service provider/system, a portal and/or search engine service provider/ system, a wireless communication service provider/system; and/or any combination thereof. Of course, these are merely examples of electronic device types that computing platform 600 may comprise, and the scope of claimed subject matter is not limited in these respects.

Computing platform 600 for this embodiment may comprise a central processing unit 610 coupled to a system logic device 620. System logic 620 may comprise a memory controller that may provide processor 610 and/or other system resources access to a system memory 630. Although the example embodiment depicted in FIG. 6 utilized a single central processing unit, the scope of claimed subject matter is not so limited. Other embodiments may comprise more than one processing unit. Also, for some embodiments, multiple processors may be incorporated into a single package. For example, processing unit 610 may comprise multiple semiconductor dice. Further, processing unit 610 may be representative of one or more circuits configurable to perform at least a portion of a data computing procedure or process. By way of example but not limitation, processing unit 610 may include one or more processors, controllers, microprocessors, microcontrollers, application specific integrated circuits, digital signal processors, programmable logic devices, field programmable gate arrays, and the like, or any combination thereof.

System memory 630 may be representative of any data storage mechanism. System memory 630 may comprise, for example, a random access memory, read only memory, etc.

For an embodiment, system memory 630 may comprise synchronous dynamic random access memory (SDRAM). Also for an embodiment, system memory 630 may comprise double data-rate (DDR) SDRAM. DDR SDRAM may be characterized as generally doubling the data transfer rates of standard SDRAM. Of course, these are merely examples of the types of memory that may comprise system memory, and the scope of claimed subject matter is not limit in this respect.

System logic 620 may further be coupled to a secondary memory 632. Secondary memory 632 may comprise, for example, the same or similar type of memory as system memory 630 and/or one or more data storage devices or systems, such as, for example, a disk drive, an optical disc drive, a tape drive, a solid state memory drive, etc.

Computing platform 600 for this example embodiment further comprises a graphics processor 640 coupled to a display device 642. Graphics processor 640 may be coupled to system logic 620 by way of an interconnect such as, for example, a peripheral component interconnect express (PCI-e) bus or an advanced graphic port (AGP), to name but a couple of example interconnect types. Display device 642 for one or more embodiments may comprise, for example, a liquid crystal display (LCD) screen, a cathode ray tube (CRT), a plasma screen display, a light-emitting diode (LED) display, etc. Further, although only one display device is depicted in FIG. 6, other embodiments may comprise more than one display device. Also, display device 642 may comprise any display ranging from very small in size for smaller, portable electronic devices, to very large for embodiments utilizing large flat-panel screens, for example. However, these are merely example display device types, and the scope of claimed subject matter is not limited in these respects.

System logic device 620 for one or more example embodiments may communicate with one or more system components by way of a interconnect 625. Interconnect 625 may comprise a parallel bus such as a peripheral component interconnect (PCI) bus, or for other embodiments may comprise a serial interconnect such as a Serial Peripheral Interface (SPI) or a Peripheral Component Interconnect Express (PCIe), to name but a few example interconnect types. Of course, the scope of claimed subject matter is not limited to any particular interconnect type.

For some embodiments, system logic 620 may be coupled to a computer-readable medium 650 via interconnect 625. Computer-readable medium 650 may include, for example, any medium that can carry and/or make accessible data, code and/or instructions for one or more of the devices in system 600. Computer readable medium 650 may also be referred to as a storage medium. For the example embodiment depicted in FIG. 6, computer-readable medium 650 may be coupled to interconnect 625 by way of one or more data storage devices or systems, such as, for example, a disk drive, an optical disc drive, a tape drive, a solid state memory drive, etc.

Computing platform 600 may further comprise, for an example embodiment, an input/output device 654. Input/output device 654 may be representative of one or more devices or features that may be configurable to accept or otherwise introduce human and/or machine inputs, and/or one or more devices or features that may be configurable to deliver or otherwise provide for human and/or machine outputs. In an embodiment, input/output device 654 may comprise a Universal Serial Bus controller, although the scope of claimed subject matter is not limited in this respect.

For the example embodiment depicted in FIG. 6, input/output device 654 may provide an interface to a pointing device 671, a keyboard 672, and/or an audio device 673, to list but a few examples. In an embodiment, pointing device 671 may comprise a mouse, a trackball, and/or a touch screen, to name some examples.

For one or more embodiments, pointing device 671 may be utilized by a Web page designer/user to draw containers on a screen representation of the Web design as displayed by display device 642. In an embodiment, a Web design tool may comprise a software application stored in system memory 630 and/or on secondary memory 632. The software application may comprise a number of instructions that may be executed by processing unit 610 and/or graphics processor 640, for an example embodiment. The Web design tool may accept user inputs from keyboard 672 and/or from pointing device 671. In an embodiment, display device 642, pointing device 671, and keyboard 672 may comprise what may be referred to as a graphical user interface (GUI) whereby inputs provided by a user via pointing device 671 and/or keyboard 672 may be reflecting in the output displayed to the user via display device 642. Of course, these are merely example device types that may comprise a GUI, and the scope of claimed subject matter is not limited in these respects.

Also for an embodiment, the Web design tool may further accept input from the user specifying that the Web design be exported to secondary memory 632. As mentioned above, to export a Web design is to generate markup language code in accordance with the Web page designed by the user. In an embodiment, the techniques described above for automatically generating a container hierarchy may be performed at least in part in response to an input received from a user by way of keyboard 672 and/or by pointing device 671.

Audio device 673 may comprise, for example, a digital-to-analog converter, an audio amplifier, and a speaker, in one or more embodiments, although the scope of claimed subject matter is not limited in this respect. Audio unit 673 may further comprise an analog-to-digital converter that may accept audio input signals, convert those signals to digital data streams, and provide those data streams to computing platform 600, although again, the scope of claimed subject matter is not limited in this respect.

Computing platform 600 for this example embodiment may further comprise a communication interface 652 that may provide communications with a network 660, as shown in FIG. 6. Communication interface 652 may be representative of one or more communication links, processes, and/or resources adaptable to support the exchange of data between computing platform 600 and at least one other device. By way of example but not limitation, communication interface 652 may include a network interface device or card, a modem, a router, a switch, a transceiver, and the like. Also by way of example and not by limitation, network 660 may comprise wireless and/or wired communication links, telephone or telecommunications systems, data buses or channels, optical fibers, terrestrial or satellite resources, local area networks, wide area networks, intranets, the Internet, routers or switches, and/or the like, or any combination thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Likewise, the terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

Embodiments disclosed herein may be implemented in hardware, such as implemented to operate on a device or combination of devices, whereas another embodiment may be implemented in software. Likewise, an embodiment may be implemented in firmware, or as any combination of hardware, software, and/or firmware, for example.

Likewise, although the scope of claimed subject matter is not limited in this respect, one embodiment may comprise one or more articles, such as a storage medium or storage media. This storage media may have stored thereon instructions that if executed by a computing platform, such as a computer, a computing system, an electronic computing device, a cellular phone, a personal digital assistant, and/or other information handling system, for example, may result in an embodiment of a method in accordance with claimed subject matter being executed, for example. The terms "storage medium" and/or "storage media" as referred to herein relate to media capable of maintaining expressions which are perceivable by one or more machines. For example, a storage medium may comprise one or more storage devices for storing machine-readable instructions and/or information. Such storage devices may comprise any one of several media types including, but not limited to, any type of magnetic storage media, optical storage media, semiconductor storage media, disks, floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing platform. However, these are merely examples of a storage medium, and the scope of claimed subject matter is not limited in this respect.

The term "instructions" as referred to herein relates to expressions which represent one or more logical operations. For example, instructions may be machine-readable by being interpretable by a machine for executing one or more operations on one or more data objects. However, this is merely an example of instructions, and the scope of claimed subject matter is not limited in this respect. In another example, instructions as referred to herein may relate to encoded commands which are executable by a processor having a command set that includes the encoded commands. Such an instruction may be encoded in the form of a machine language understood by the processor. For an embodiment, instructions may comprise run-time objects, such as, for example, Java and/or Javascript and/or PHP objects. However, these are merely examples of an instruction, and the scope of claimed subject matter is not limited in this respect.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method, comprising:
    receiving at a processor one or more signals indicative of a document design comprising a plurality of containers;
    determining a container hierarchy for said plurality of containers utilizing said processor, wherein said determining comprises:
        row partitioning the plurality of containers into two or more initial rows, wherein each initial row is bounded by a width of the design document and an overall height of two or more containers included in the row, wherein each container included in the row is fully contained within the row;
        column partitioning at least one of the two or more initial rows comprising two or more containers into two or more initial columns, wherein each initial column is bounded by an overall width of any containers included in the column and is bounded by the height of the initial row, wherein each initial column includes at least one container and each container of the initial column is fully contained within the column; and
        repeating in an iterative fashion, for each column having two or more containers, said row partitioning and said column partitioning until each column includes only one container;
    transmitting from the processor to a memory one or more signals indicative of the container hierarchy; and
    storing said one or more signals indicative of the container hierarchy in said memory.

2. The method of claim 1, wherein said receiving at the processor one or more signals indicative of the document design comprises receiving at the processor one or more signals indicative of a web page design, and wherein said storing said one or more signals indicative of the container hierarchy in said memory comprises exporting markup language code based at least in part on the web page design.

3. The method of claim 2, wherein said container hierarchy specifies a plurality of parent-child relationships among the plurality of containers.

4. The method of claim 3, wherein said container hierarchy further specifies relative positions among the plurality of containers.

5. The method of claim 4, wherein said plurality of containers comprise a plurality of <div> statements in a hypertext markup language (HTML).

6. The method of claim 4, wherein the relative horizontal positions among the plurality of containers are specified by left and right margin values for the individual containers.

7. The method of claim 4, wherein the relative vertical positions among the plurality of containers are specified by top and/or bottom margin values for the individual containers.

8. An article, comprising: a non-transitory storage medium having stored thereon instructions that, in response to being executed by a processor, result in:
    obtaining one or more signals indicative of a document design comprising a plurality of containers;
    determining a container hierarchy for said plurality of containers, wherein said determining comprises:
        row partitioning the plurality of containers into two or more initial rows, wherein each initial row is bounded by a width of the design document and an overall height of two or more containers included in the row, wherein each container included in the row is fully contained within the row;
        column partitioning at least one of the two or more initial rows comprising two or more containers into two or more initial columns, wherein each initial column is bounded by an overall width of any containers included in the column and is bounded by the height of the initial row, wherein each initial column includes at least one container and each container of the initial column is fully contained within the column; and repeating in an iterative fashion, for each column having two or more containers, said row partitioning and said column partitioning until each column includes only one container; and transmitting to a memory one or more signals indicative of the container hierarchy.

9. The article of claim 8, wherein the storage medium has stored thereon further instructions that, in response to being executed by the processor, further result in:

obtaining one or more signals indicative of the document design at least in part by obtaining one or more signals indicative of a web page design; and transmitting said one or more signals indicative of the container hierarchy to said memory by exporting markup language code based at least in part on the web page design.

10. The article of claim 9, wherein said container hierarchy specifies a plurality of parent-child relationships among the plurality of containers.

11. The article of claim 10, wherein said container hierarchy further specifies relative positions among the plurality of containers.

12. The article of claim 11, wherein said plurality of containers comprise a plurality of <div> statements in a hypertext markup language (HTML).

13. The article of claim 11, wherein the relative horizontal positions among the plurality of containers are specified by left and right margin values for the individual containers.

14. The article of claim 11, wherein the relative vertical positions among the plurality of containers are specified by top and/or bottom margin values for the individual containers.

15. An apparatus, comprising:

a processor adapted to receive one or more signals indicative of a document design comprising a plurality of containers, said processor further adapted to:

determine a container hierarchy for said plurality of containers, wherein to determine a container hierarchy said processor is further adapted to:

row partition the plurality of containers into two or more initial rows, wherein each initial row is bounded by a width of the design document and an overall height of two or more containers included in the row, wherein each container included in the row is fully contained within the row;

column partition at least one of the two or more initial rows comprising two or more containers into two or more initial columns, wherein each initial column is bounded by an overall width of any containers included in the column and is bounded by the height of the initial row, wherein each initial column includes at least one container and each container of the initial column is fully contained within the column; and repeat in an iterative fashion, for each column having two or more containers, said row partitioning and said column partitioning until each column includes only one container; and transmit to a memory one or more signals indicative of the container hierarchy.

16. The apparatus of claim 15, wherein said document design comprises a web page design, and wherein said processor is further adapted to transmit said one or more signals indicative of the container hierarchy to said memory by exporting markup language code based at least in part on the web page design.

17. The apparatus of claim 16, wherein said container hierarchy specifies a plurality of parent-child relationships among the plurality of containers.

18. The apparatus of claim 17, wherein said container hierarchy further specifies relative positions among the plurality of containers.

19. The apparatus of claim 18, wherein said plurality of containers comprise a plurality of <div> statements in a hypertext markup language (HTML).

20. The apparatus of claim 18, wherein the relative horizontal positions among the plurality of containers are specified by left and right margin values for the individual containers, and wherein the relative vertical positions among the plurality of containers are specified by top and/or bottom margin values for the individual containers.

* * * * *